(12) United States Patent
Ghergu et al.

(10) Patent No.: US 11,777,833 B2
(45) Date of Patent: Oct. 3, 2023

(54) NON-INTRUSIVE DISASTER RECOVERY AND RESILIENCE

(71) Applicant: International Business Machines Corporation, Armonk, NY (US)

(72) Inventors: Laurentiu Gabriel Ghergu, Bucharest (RO); Pavol Dobias, Melcice (SK); Erik Rueger, Ockenheim (DE); Iasmina Boldea, Giroc (RO); Adina Pana, Bucharest (RO)

(73) Assignee: International Business Machines Corporation, Armonk, NY (US)

( * ) Notice: Subject to any disclaimer, the term of this patent is extended or adjusted under 35 U.S.C. 154(b) by 29 days.

(21) Appl. No.: 17/475,388

(22) Filed: Sep. 15, 2021

(65) Prior Publication Data
US 2023/0084487 A1    Mar. 16, 2023

(51) Int. Cl.
| H04L 43/50 | (2022.01) |
| H04L 41/0654 | (2022.01) |
| H04L 43/0811 | (2022.01) |

(52) U.S. Cl.
CPC ............ H04L 43/50 (2013.01); H04L 41/0654 (2013.01); H04L 43/0811 (2013.01)

(58) Field of Classification Search
CPC ... H04L 43/50; H04L 41/0654; H04L 43/0811
See application file for complete search history.

(56) References Cited

U.S. PATENT DOCUMENTS

| 8,077,718 | B2* | 12/2011 | Mortier et al. ..... | H04L 43/0811 709/224 |
| 8,984,047 | B2 | 3/2015 | Gassewitz et al. | |
| 9,276,806 | B2 | 3/2016 | Cartmell et al. | |
| 9,432,274 | B1* | 8/2016 | Peon et al. .......... | H04L 1/1835 |
| 9,503,342 | B2 | 11/2016 | Scott et al. | |
| 9,531,790 | B2 | 12/2016 | Bengali et al. | |
| 10,142,353 | B2* | 11/2018 | Yadav et al. ....... | H04L 63/1425 |
| 10,805,322 | B2 | 10/2020 | Stevens et al. | |
| 2003/0018657 | A1 | 1/2003 | Monday | |

(Continued)

FOREIGN PATENT DOCUMENTS

| CN | 101075894 B | 5/2012 |
| EP | 2493136 A1 | 8/2012 |

OTHER PUBLICATIONS

Anagnostopoulos et al., "Tracing Your Smart-Home Devices Conversations: A Real World IoT Traffic Data-Set", Sensors 2020, 20, 6600; doi:10.3390/s20226600, Oct. 4, 2020; Accepted: Nov. 16, 2020; Published: Nov. 18, 2020, 28 pages.
Riverbed, "Five Ways Riverbed Secures the IoT Edge", Riverbed Technology, Apr. 3, 2018, 5 pages.
Riverbed, "Virtual Steelfusion™ Edge Installation Guide", VSFE models 1000/1100, Sep. 2016, 36 pages.

(Continued)

*Primary Examiner* — Mohamed A. Wasel
*Assistant Examiner* — James Ross Hollister
(74) *Attorney, Agent, or Firm* — Stephanie L. Carusillo (57) ABSTRACT

A tool for network-based package monitoring and recovery. The tool scans a database to identify a gap in network traffic data. The tool determines whether at least one gap in the network traffic data is identified in the database, wherein the at least one gap is a gap in communication between a target device and a communication serve. Responsive to a determination that at least one gap in the network traffic data is identified, the tool determines a missing package from a package archive. The tool determines whether there is active network traffic between the target device and the communication server. Responsive to a determination that there is active network traffic between the target device and the communication server, the tool replays the missing package in the active network traffic between the target device and the communication server.

20 Claims, 4 Drawing Sheets

(56) References Cited

U.S. PATENT DOCUMENTS

| | | | | |
|---|---|---|---|---|
| 2005/0226143 | A1* | 10/2005 | Barnhart et al. | H04L 43/00 |
| | | | | 370/216 |
| 2009/0064248 | A1* | 3/2009 | Kwan et al. | H04L 49/555 |
| | | | | 725/109 |
| 2012/0066612 | A1* | 3/2012 | Virmani et al. | G06F 9/451 |
| | | | | 715/748 |
| 2013/0282892 | A1* | 10/2013 | Levi et al. | G06F 8/34 |
| | | | | 709/224 |
| 2014/0198790 | A1 | 7/2014 | Christenson et al. | |
| 2017/0244593 | A1 | 8/2017 | Rangasamy et al. | |
| 2020/0195741 | A1* | 6/2020 | Chakra et al. | H04L 67/12 |
| 2021/0050940 | A1* | 2/2021 | Hughes | H04L 69/22 |
| 2021/0258106 | A1* | 8/2021 | Rozenberg et al. | H04L 12/1868 |
| 2022/0124076 | A1* | 4/2022 | Chaubey | H04L 63/0281 |

OTHER PUBLICATIONS

Tsubaki et al., "Effective disaster recovery for edge computing against large-scale natural disasters", 2020 IEEE 17th Annual Consumer Communications & Networking Conference (CCNC), 2 pages.

"Disaster recovery management with event logging", An IP.com Prior Art Database Technical Disclosure, Authors et. al.: Disclosed Anonymously, IP.com Number: IPCOM000237492D, IP.com Electronic Publication Date: Jun. 19, 2014, 4 pages.

Huacarpuma et al., "Distributed Data Service for Data Management in Internet of Things Middleware", Sensors 2017, 17, 977; doi:10.3390/s17050977, Dec. 17, 2016; Accepted: Apr. 21, 2017; Published: Apr. 27, 2017, 25 pages, <www.mdpi.com/journal/sensors>.

* cited by examiner

NON-INTRUSIVE DISASTER RECOVERY AND RESILIENCE

BACKGROUND OF THE INVENTION

The present invention relates generally to disaster recovery solutions, and more particularly to network-based package monitoring and recovery.

The global market for Internet of Things (IoT) end-user solutions is expected to grow to around 1.6 trillion dollars by the year 2025. A wide range of IoT application are transferring data from a network edge to a cloud for storage and processing.

For example, an electricity meter system is a system that may utilize IoT devices for collecting electricity consumption data and sending it to a cloud for storage and processing. The electricity meter system may include an integrated IoT device that reads energy consumption data and sends the data over a network to a cloud for storage and processing. Based on available information, the electricity meter system calculates an electricity bill and transmits the bill to an end-user.

Traditionally, disaster recovery solutions rely on data backups at a database level. These data backups can be restored in case of a disaster, such that a system can recover lost data.

SUMMARY

Aspects of an embodiment of the present invention disclose a method, computer program product, and computer system for providing network-based package monitoring and recovery. The method includes scanning, by one or more computer processors, a database to identify a gap in network traffic data. The method includes determining, by the one or more computer processors, whether at least one gap in the network traffic data is identified in the database, wherein the at least one gap is a gap in communication between a target device and a communication server. Responsive to a determination that at least one gap in the network traffic data is identified, the method includes determining, by the one or more computer processors, a missing package from a package archive. The method includes determining, by the one or more computer processors, whether there is active network traffic between the target device and the communication server. Responsive to a determination that there is active network traffic between the target device and the communication server, the method includes replaying, by the one or more computer processors, the missing package in the active network traffic between the target device and the communication server.

DETAILED DESCRIPTION

Embodiments of the present invention recognize that data restoration requires time and significant storage resources, and there is always a subset of data lost, such as the data that was in transit during the replication between a primary database and a secondary database. Embodiments of the present invention further recognize that, during a system disaster, a part of data can be lost due to data replication mechanisms. Embodiments of the present invention further recognize that it is difficult to implement a disaster recovery feature without modifying an existing system. Embodiments of the present invention further recognize that traditional data recovery systems increase costs associated with disaster recovery due to a need to duplicate data in two databases (i.e., a primary database and a secondary database), and increase complexity of management and operation due to advanced database replication that needs to be in place prior to a system disaster. Embodiments of the present invention further recognize that, with traditional data recovery systems, system administrators must rely on expensive database replication solutions and incur additional licensing costs to ensure disaster recovery for IoT applications.

Embodiments of the present invention provide the capability to continuously detect whether there is a data loss at a database level and re-inject any missing packages into a database to ensure a self-healing property for an IoT application. Embodiments of the present invention provide the capability to analyze network traffic for a disaster recovery use case. Embodiments of the present invention provide the capability to capture binary traffic data generated by IoT edge devices, store the data, and regenerate the data on a network as a disaster recovery solution. Embodiments of the present invention provide the capability to monitor network traffic, detect missing packets of data (i.e., packages) in the network traffic, and upon detecting missing packets of data, transmit (i.e., replay) the missing packets of data over the network automatically, or manually via a user request.

Embodiments of the present invention provide an autonomous disaster recovery solution that does not require advanced skills for setup and operation, and that can be placed in any node between an IoT device and a server. Embodiments of the present invention provide the capability to save storage space and costs (e.g., costs associated with a phone company) for backup data by capturing network-based packages that are already optimized for network bandwidth and archiving the network-based packages in local storage. Embodiments of the present invention provide a disaster recovery solution that can be used with any kind of IoT communication type and any type of data link layer packages. Embodiments of the present invention provide a disaster recovery solution that can be easily and quickly applied to legacy IoT applications, as the disaster recovery solution does not require any modifications to an existing system.

Implementation of such embodiments may take a variety of forms, and exemplary implementation details are discussed subsequently with reference to the Figures.

Figure 1:
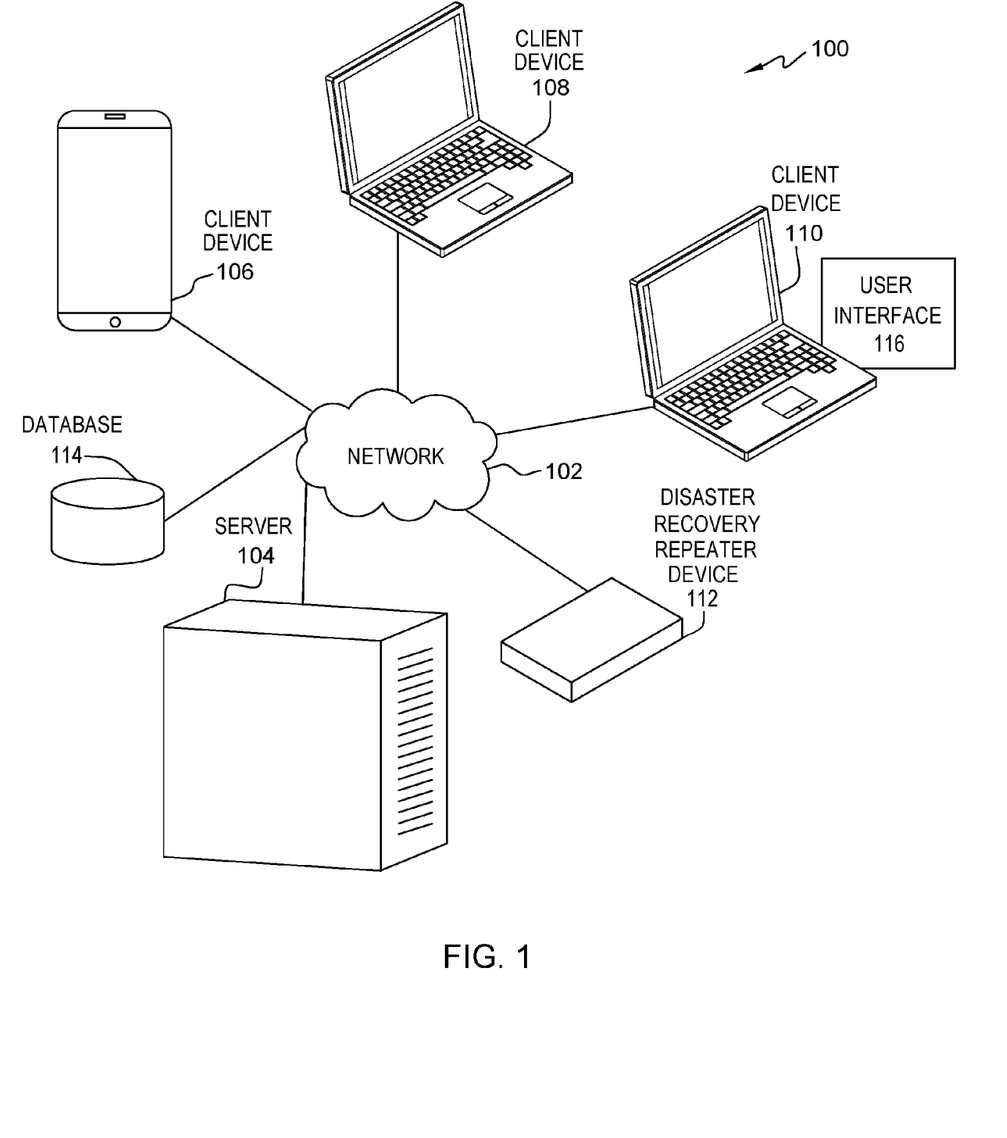
FIG. 1 illustrates a data processing environment, generally designated 100, in accordance with an embodiment of the present invention.

Referring now to various embodiments of the invention in more detail, FIG. 1 is a functional block diagram that illustrates a data processing environment, generally designated 100, suitable for providing network-based package monitoring and recovery across one or more computer devices, in accordance with at least one embodiment of the invention. The present invention will now be described in detail with reference to the Figures. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims. FIG. 1 includes one or more networks, such as network 102, one or more servers, such as server 104, one or more client devices, such as client device 106, client device 108, and client device 110, a disaster recovery repeater (DRR) device, such as DRR device 112, and a database, such as database 114.

In one embodiment, network 102 is the Internet representing a worldwide collection of networks and gateways that use TCP/IP protocols to communicate with one another. Network 102 may include wire cables, wireless communication links, fiber optic cables, routers, switches and/or firewalls. Server 104, client device 106, client device 108, and client device 110 are interconnected by network 102. Network 102 can be any combination of connections and protocols capable of supporting communication between server 104, client device 106, client device 108, client device 110, and DRR device 112. Network 102 can be, for example, a global system for mobile communication (GSM) network, an Internet of Things (IoT) network, a local area network (LAN), a virtual local area network (VLAN), a wide area network (WAN), such as the Internet, or a combination of any of the five, and can include wired, wireless, or fiber optic connections. Network 102 may include one or more wired and/or wireless networks that are capable of receiving and transmitting data, voice, and/or video signals, including multimedia signals that include voice, data, and video information. In general, network 102 may be any combination of connections and protocols that will support communication between server 104, client device 106, client device 108, client device 110, and DRR device 112, as well as other computing devices (not shown) within data processing environment 100. FIG. 1 is intended as an example and not as an architectural limitation for the different embodiments.

In one embodiment, server 104 may be, for example, a server computer system such as a communication server, a web server, or any other electronic device or computing system capable of sending and receiving data. In another embodiment, server 104 may be a data center, consisting of a collection of networks and servers, such as virtual servers and applications deployed on virtual servers, to an external party. In another embodiment, server 104 represents a "cloud" of computers interconnected by one or more networks, where server 104 is a computing system utilizing clustered computers and components to act as a single pool of seamless resources when accessed through network 102. This is a common implementation for data centers in addition to cloud computing applications. In one embodiment, server 104 is a communication server capable of receiving encrypted data packages from one or more interconnected Internet of Things (IoT) devices, such as client device 106 and client device 108, and storing the encrypted data packages in a datastore, such as database 114.

In one embodiment, DRR device 112 is a physical device that operates on an edge of a network connecting one or more Internet of Things (IoT) devices (e.g., IoT devices on a code-division multiple access (CDMA) network), such as client device 106 and client device 108, to a communication server (e.g., a server on an enterprise network), such as server 104, and can be utilized by a client device, such as client device 110, via a user interface, such as user interface 116. In an alternative embodiment, DRR device 112 may be a software component, downloaded from a central server, such as server 104, and installed on one or more client devices, such as client device 110. In yet another embodiment, DRR device 112 may be utilized as a software service provided by a third-party cloud service provider (not shown). In yet another embodiment, DRR device 112 may include one or more fully integrated components (not shown), such as add-ons, plug-ins, and agent programs, etc., or one or more components installed on one or more client devices, such as client device 106, client device 108, and client device 110, to provide network-based package monitoring and recovery. In one embodiment, DRR device 112 can be an add-on feature to a computer program that provides a user the ability to monitor network traffic between a target IoT device and a communication server, duplicate network traffic, store archives of data packages transmitted over the network, and restore (i.e., replay) archived data packages in the network traffic during a disaster recovery use case. In one embodiment, DRR device 112 can be fully integrated, partially integrated, or separate from a third-party service (e.g., system disaster recovery service, communication service, etc.). In one embodiment, DRR device 112 may be an application, downloaded from an application store or third-party provider, capable of being used in conjunction with a computer program during interactions between one or more target IoT devices and a communication server, such as client device 106, client device 108, and client device 110, to provide non-intrusive disaster recovery and resilience solutions.

In one embodiment, DRR device 112 can be utilized by one or more user devices, such as client device 106, client device 108, and client device 110, to provide non-intrusive disaster recovery and resilience solutions. In one embodiment, DRR device 112 provides network-based Internet of Things (IoT) package monitoring and recovery in disaster recovery solutions. In one embodiment, DRR device 112 provides the capability to monitor and capture network-based and device specific packages, store binary edge device traffic and manage individual datagram, automatically detect disaster recovery scenarios for IoT communication, and replay packages on a network for disaster recovery in IoT applications. In one embodiment, DRR device 112 provides that capability to intercept communication from a target IoT device, store one or more packages in a local archive in an order that matches the order in which the one or more packages are transmitted across a network and send the one or more packages onwards to a communication server (e.g., a cluster of servers, one or more distributed servers, a group of data centers, etc.). In one embodiment, DRR device 112 provides the capability to, responsive to a server going down or detecting loss of any previously stored packages, identify missing packages and send the missing packages onward to the server for processing or re-processing. In one embodiment, DRR device 112 provides the capability to capture network traffic sent by one or more IoT devices and store network traffic (i.e., network packages, data packets, etc.) for re-processing in the event of a disaster for system recovery. In one embodiment, DRR device 112 provides the capability to replicate an order in which one or more packages are transmitted on a network and store an associated timestamp along with a unique identifier for each of the one or more packages, which can be in any format, such as transmission control protocol (TCP) and user datagram protocol (UDP). In one embodiment, DRR device 112 provides the capability to trigger data recovery automatically, based on performing a periodic query of an application database to determine whether any specific index range is missing from a plurality of tables, indicating that a package was not stored by a communication server. In one embodiment, DRR device 112 provides the capability to reinsert (i.e., repeat, replay, resend, etc.) stored TCP/UDP packages on the same network from where the packages were monitored and captured towards a communication server of an IoT solution. In one embodiment, DRR device 112 provides the capability for IoT devices to continue normal operation during data recovery procedures, as packages sent from the IoT devices can be processed in parallel with stored archived packages that are reinserted for data recovery and restoration. In one embodiment, DRR device 112 may be configured to include an integrated processing unit component (not shown) and an integrated persistent storage package archive (not shown). In one embodiment, DRR device 112 utilizes the integrated processing unit component to filter a plurality of packages captured from network traffic between a target IoT device and a server, such as client device 106 and server 104, manage package storage within the integrated persistent storage package archive, automatically detect system disasters, and automatically insert lost data back into the network traffic.

In one embodiment, DRR device 112 may be configured to access various data sources, such as a database or repository, that may include personal data, content, contextual data, or information that a user does not want to be processed. Personal data includes personally identifying information or sensitive personal information as well as user information, such as location tracking or geolocation information. Processing refers to any operation, automated or unautomated, or set of operations such as collecting, recording, organizing, structuring, storing, adapting, altering, retrieving, consulting, using, disclosing by transmission, dissemination, or otherwise making available, combining, restricting, erasing, or destroying personal data. In one embodiment, DRR device 112 enables the authorized and secure processing of personal data. In one embodiment, DRR device 112 provides informed consent, with notice of the collection of personal data, allowing the user to opt in or opt out of processing personal data. Consent can take several forms. Opt-in consent can impose on the user to take an affirmative action before personal data is processed. Alternatively, opt-out consent can impose on the user to take an affirmative action to prevent the processing of personal data before personal data is processed. In one embodiment, DRR device 112 provides information regarding personal data and the nature (e.g., type, scope, purpose, duration, etc.) of the processing. In one embodiment, DRR device 112 provides a user with copies of stored personal data. In one embodiment, DRR device 112 allows the correction or completion of incorrect or incomplete personal data. In one embodiment, DRR device 112 allows the immediate deletion of personal data.

In one embodiment, client device 106, client device 108, and client device 110 are clients to server 104 and may be, for example, a desktop computer, a laptop computer, a tablet computer, a personal digital assistant (PDA), a smart phone, a thin client, or any other electronic device or computing system capable of communicating with server 104 through network 102. For example, client device 106 may be a mobile device, such as a smart phone, capable of connecting to a network, such as network 102, to access the Internet, one or more software applications, and one or more input/output devices (e.g., camera, microphone, speakers, sensors, etc.). In one embodiment, client device 106, client device 108, and client device 110 may be any suitable type of Internet of Things (IoT) device capable of executing one or more applications utilizing a mobile operating system or a computer operating system, capturing data from one or more sources, and sending the data to a communication server for processing. In one embodiment, client device 110 may include a user interface, such as user interface 116, for providing a user with the capability to interact with a server computer, such as server 104, one or more IoT devices, such as client device 106 and client device 108, a disaster recovery repeater (DRR) device, such as DRR device 112, and a database, such as database 114 via a network, such as network 102.

In one embodiment, client device 106, client device 108, and client device 110 may be any wearable electronic devices, including wearable electronic devices affixed to eyeglasses and sunglasses, helmets, wristwatches, clothing, wigs, tattoos, embedded devices, and the like, capable of sending, receiving, and processing data. In one embodiment, client device 106, client device 108, and client device 110 may be any wearable computer device capable of supporting IoT device functionality and transmitting data to a communication server, such as server 104. In one embodiment, client device 106, client device 108, and client device 110 may include one or more sensors (e.g., heart rate monitors, blood oxygen saturation sensors, sleep sensors, accelerometers, motion sensors, thermal sensors, radio frequency identification (RFID) sensors, cameras, microphones, etc.). Wearable computers are miniature electronic devices that may be worn by the bearer under, with, or on top of clothing, as well as in or connected to glasses, hats, or other accessories. Wearable computers are especially useful for applications that require more complex computational support than merely hardware coded logics. In general, client device 106, client device 108, and client device 110 each represent one or more programmable electronic devices or combination of programmable electronic devices capable of executing machine readable program instructions and communicating with other computing devices (not shown) within data processing environment 100 via a network, such as network 102.

In one embodiment, database 114 is a storage repository interconnected with a server, such as server 104, and a disaster recovery repeater (DRR) device, such as DRR device 112, via a network, such as network 102. In another embodiment, database 114 is a storage repository capable of wirelessly pairing and communicating with a server computer, such as server 104, a client device, such as client device 110, and a DRR device, such as DRR device 112. In one embodiment, database 114 is a data structure that stores structured query language (SQL) data packets (i.e., packages) transmitted to a server computer, such as server 104, from one or more interconnected Internet of Things (IoT) devices, such as client device 106 and client device 108. In some embodiments, DRR device 112 accesses, via network 102, database 114 to monitor and retrieve data packets or packages originating from one or more IoT devices, such as client device 106 and client device 108.

In some embodiments, database 114 can be a web server, a mobile computing device, a laptop computer, a tablet computer, a netbook computer, a personal computer (PC), a desktop computer, or any programmable electronic device or computing system capable of receiving, storing, and sending files and data, and performing computer readable program instructions capable of communicating with a server computer, such as server 104, and one or more computing devices, such as client device 110, via network 102. In other embodiments, database 114 can represent a virtual instance operating on a computing system utilizing clustered computers and components (e.g., database server computer, application server computers, etc.) that act as a single pool of seamless resources when accessed within data processing environment 100.

In one embodiment, user interface 116 provides an interface between a user of client device, such as client device 110, server 104, and database 114. In one embodiment, user interface 116 may be a graphical user interface (GUI) or a web user interface (WUI) and can display text, documents, web browser windows, user options, application interfaces, and instructions for operation, and include the information (such as graphic, text, and sound) that a program presents to a user and the control sequences the user employs to control a program. In one embodiment, user interface 116 refers to the information (such as graphic, text, and sound) a program presents to a user and the control sequences the user employs to control the program. There are many types of user interfaces. In one embodiment, user interface 116 may be a graphical user interface (GUI). A GUI is a type of user interface that allows users to interact with electronic devices, such as a keyboard and mouse, through graphical icons and visual indicators, such as secondary notations, as opposed to text-based interfaces, typed command labels, or text navigation. In computers, GUIs were introduced in reaction to the perceived steep learning curve of command-line interfaces, which required commands to be typed on the keyboard. The actions in GUIs are often performed through direct manipulation of the graphics elements. In another embodiment, user interface 116 may also be mobile application software that provides an interface between a user of a client device, such as client device 110, and a server, such as server 104, a disaster recovery repeater (DRR) device, such as DRR device 112, a database, such as database 114, and one or more IoT devices, such as client device 106 and client device 108. Mobile application software, or an "app," is a computer program that runs on smartphones, tablet computers, smartwatches and any other mobile devices.

Figure 2:
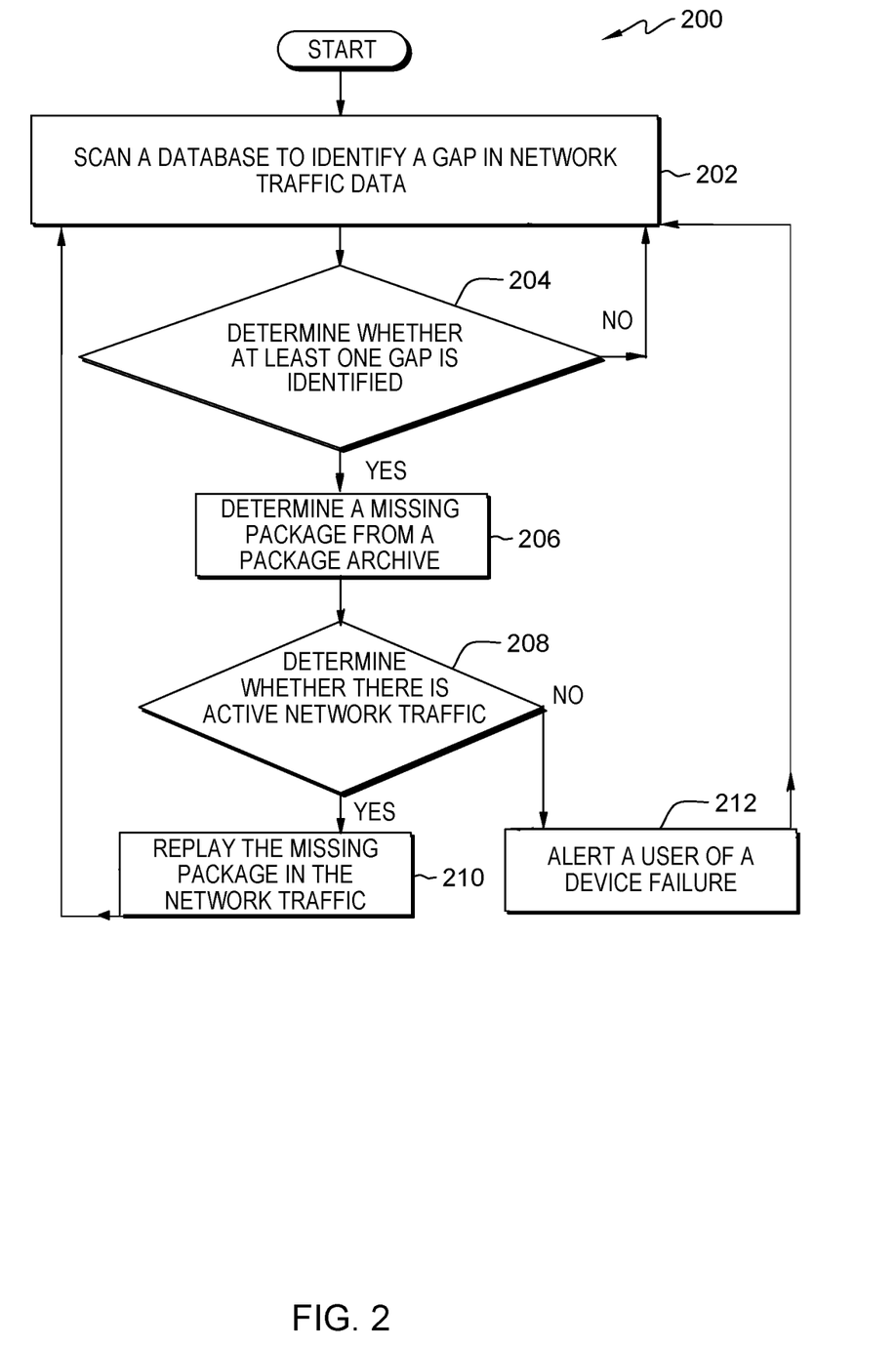
FIG. 2 is a flowchart, generally designated 200, depicting operational steps of a disaster recovery repeater (DRR) device, such as the DRR device of FIG. 1, for providing network-based package recovery, in accordance with an embodiment of the present invention.

FIG. 2 is a flowchart, generally designated 200, depicting operational steps of a disaster recovery repeater device, such as DRR device 112, for providing network-based package recovery for one or more computer devices, in accordance with an embodiment of the present invention. Although FIG. 2 depicts operational steps of a disaster recovery repeater device for providing network-based package recovery for one or more computer devices, embodiments of the present invention may be similarly practiced by a disaster recovery repeater program (not shown) on a server computer or client device, such as server 104 or client device 110, having computer-readable program instructions that, when executed, provide network-based package recovery. Further, it should be understood that the operational steps of FIG. 2 may be executed seamlessly and concurrently with the operational steps depicted in FIG. 3.

DRR device 112 scans a database to identify a gap in network traffic data (202). In one embodiment, DRR device 112 scans a database, such as database 114, interconnected with a communication server, such as server 104, to identify a gap in network traffic data sent from a target Internet of Things (IoT) device, such as client device 106, to the communication server. In one embodiment, DRR device 112 periodically scans specific unique identifiers (IDs) of a plurality of rows in one or more tables of the database to identify any gaps in data packages. In one embodiment, gaps in data packages indicate that at least some of the target IoT device data packages were lost in transit from the IoT device to the communication server or were lost in a system disaster.

DRR device 112 determines whether at least one gap is identified (decision block 204). In one embodiment, DRR device 112 determines whether at least one gap is identified in the database by periodically scanning a plurality of primary keys of a plurality of records in an application database to determine that for a specific range of primary keys, the plurality of primary keys within the specific range is not ordered sequentially. In one embodiment, DRR device 112 periodically accesses persistent storage of the communication server to detect any gaps in the data packets from the target IoT device stored in the communication server persistent storage. Where DRR device 112 determines that the plurality of primary keys within the specified range is not ordered sequentially, DRR device 112 determines that a least one gap is identified, indicating that at least one of the data packages were lost in an exchange between the target IoT device and the communication server. Where DRR device 112 determines that the plurality of primary keys within the specified range are ordered sequentially, DRR device 112 determines that at least one gap is not identified, signifying that no data packages were lost in transmission between the target IoT device and the communication server.

Responsive to a determination that at least one gap is not identified (NO branch, 204), DRR device 112 returns to scanning a database to identify a gap in network traffic data (202).

Responsive to a determination that at least one gap is identified (YES branch, 204), DRR device 112 determines a missing package from a package archive (206). In one embodiment, DRR device 112 determines a missing package from a package archive by querying an integrated package archive (i.e., local device storage) for one or more specific data packages having primary keys missing from the sequential order of primary keys within the specified range. In one embodiment, DRR device 112 determines the missing package from the package archive by searching the integrated package archive for a specific unique identifier associated with the missing package in order to fill the identified gap in the database.

DRR device 112 determines whether there is network traffic (decision block 208). In one embodiment, DRR device 112 determines whether there is active network traffic between a target IoT device and a communication server by monitoring a network connection shared between the IoT device and the communication server to identify an exchange of data packages. In one embodiment, DRR device 112 filters data packages from the network traffic between the target IoT device and the communication server to capture only data packages generated by the target IoT device. In one embodiment, DRR device 112 differentiates the network traffic generated by the IoT devices from general network traffic, such that various service level agreements (SLA) can be implemented depending on different requirements established for each IoT device or group of IoT devices. Where there is an exchange of data packages originating from the target IoT device being transmitted to the communication server in the active network traffic, DRR device 112 determines that there is network traffic. Where there is no exchange of data packages originating from the target IoT device being transmitted to the communication server, DRR device 112 determines that there is no active network traffic.

Responsive to a determination that there is network traffic (YES branch, 208), DRR device 112 replays the missing package in the network traffic (210). In one embodiment, DRR device 112 replays (e.g., reinjects, reinserts, repeats, etc.) one or more missing packages selected from the integrated package archive into the network traffic between the IoT device and the communication server for re-processing by the communication server. In one embodiment, DRR device 112 re-injects TCP/UDP packages stored in the integrated package archive on the same network, towards the communication server of an IoT solution. In one embodiment, where DRR device 112 attempts to replay a data package that is already stored in the database interconnected with the communication server, the replay of the data package will fail based on database constraints. In one embodiment, where DRR device 112 attempts to replay a data package that is not stored in the database interconnected with the communication server, the replay of the data package will proceed, and DRR device 112 will reinject (e.g., upload) the data package into the network traffic between the target IoT device and the communication sever for re-processing and storing to the interconnected database. In one embodiment, DRR device 112 provides the communication server with the missing packages in their previously encrypted format (TCP/UDP), such that the communication server will be able to quickly re-parse the missing packages and store the missing packages in the database as expected when the target IoT device sent them. In one embodiment, DRR device 112 re-injects missing packages into the network traffic in such a way that allows the target IoT device to continue normal operation, as additional data packages that were sent can be processed in parallel with the missing packages that are reinjected for data restoration.

Responsive to a determination that there is no network traffic (NO branch, 208), DRR device 112 alerts a user of a device failure (212). In one embodiment, DRR device 112 alerts a user (e.g., system administrator, end-user, etc.) of a failure of a target IoT device, where alerting the user may include identifying a data package that failed to transmit in the network traffic between the target IoT device and the communication server, identifying a data package that failed to save in a database interconnected with the communication server, and identifying an error in the sequential order of primary keys in the one or more tables of the database interconnected with the communication server.

Figure 3:
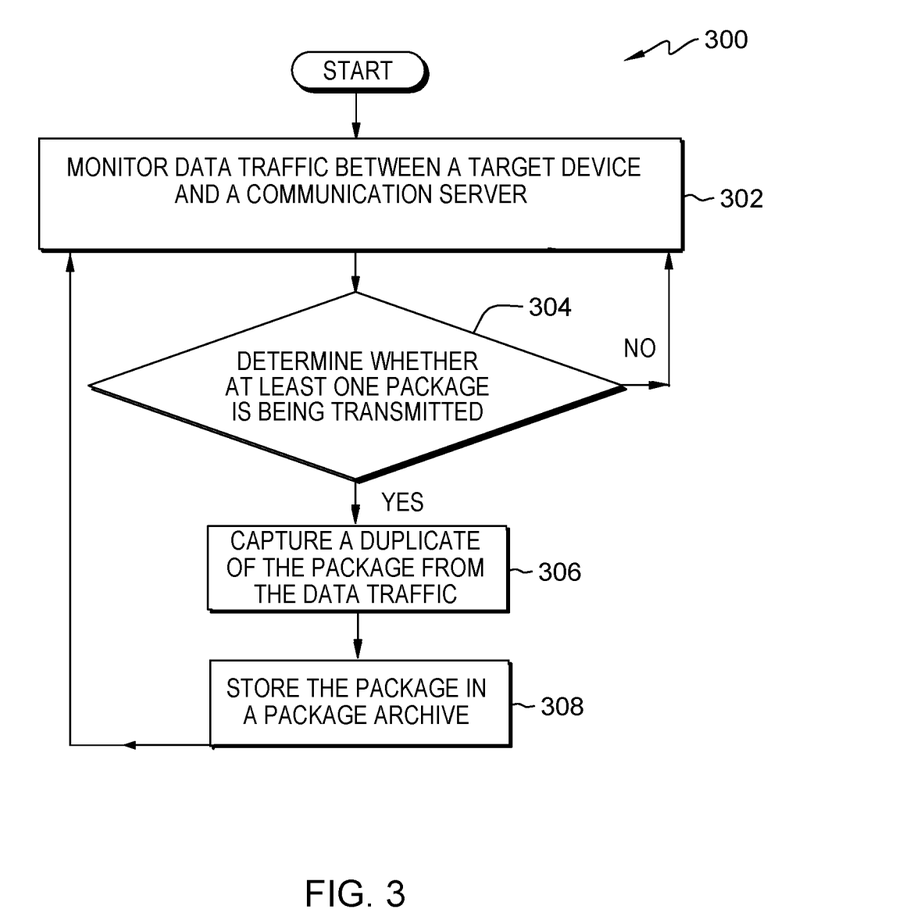
FIG. 3 is a flowchart, generally designated 300, depicting operational steps of a disaster recovery repeater (DRR) device, such as the DRR device of FIG. 1, for providing network-based package monitoring, in accordance with an embodiment of the present invention.

FIG. 3 is a flowchart, generally designated 300, depicting operational steps of a disaster recovery repeater device, such as DRR device 112, for providing network-based package monitoring and archiving for one or more computer devices, in accordance with an embodiment of the present invention. Although FIG. 3 depicts operational steps of a disaster recovery repeater device for providing network-based package monitoring and archiving for one or more computer devices, embodiments of the present invention may be similarly practiced by a disaster recovery repeater program (not shown) on a server computer or client device, such as server 104 or client device 110, having computer-readable program instructions that, when executed, provide network-based package monitoring and archiving. Further, it should be understood that the operational steps of FIG. 3 may be executed seamlessly and concurrently with the operational steps depicted in FIG. 2.

DRR device 112 monitors data traffic between a target device and a communication server (302). In one embodiment, DRR device 112 monitors network traffic between one or more target IoT devices and a communication server, where the network traffic includes specific data packets (i.e., packages), such as TCP/UDP packages, transmitted between the one or more target IoT devices and the communication server. In one embodiment, DRR device 112 is positioned at an edge of a network to filter packages from the network, such that only traffic generated by the one or more target IoT devices is monitored, captured, and subsequently stored. In one embodiment, DRR device 112 monitors data traffic between the one or more target IoT devices and the communication server by filtering the network packages in order (i.e., in a sequential order in which the packages are transmitted) to capture only the packages that are generated by a subset of specific target IoT devices. In one embodiment, DRR device 112 differentiates the network traffic generated by the one or more target IoT devices from general network traffic. In one embodiment, DRR device 112 can be configured to monitor any type of IoT communication (TCP, UDP, etc.), and any type of data link layer packages.

DRR device 112 determines whether at least one package is being transmitted (decision block 304). In one embodiment, DRR device 112 determines whether at least one package is being transmitted from the one or more target IoT devices to the communication server by confirming a data package originates from at least one of the one or more target IoT devices utilizing an internet protocol (IP) address, unique device identifier, or any other suitable technique for identifying the one or more target IoT devices. Where DRR device 112 confirms that a package in the network traffic originated from a target device, DRR device 112 determines that at least one package is being transmitted. Where DRR device 112 cannot confirm that a package in the network traffic originated from a target device, DRR device 112 determines that no package is being transmitted.

Responsive to a determination that no package is being transmitted (YES branch, 304), DRR device 112 continues to monitor data traffic between the target device and the communication server (302).

Responsive to a determination that at least one package is being transmitted (YES branch, 304), DRR device 112 captures a duplicate of the package from the data traffic (306). In one embodiment, DRR device 112 captures binary network traffic generated by the one or more target IoT devices utilizing techniques that retain a formatting that is optimized for IoT applications and network bandwidth in order to reduce costs with a network operator. In one embodiment, DRR device 112 intercepts data packets traveling from the target IoT devices to the communication server without being detected.

DRR device 112 stores the package in a package archive (308). In one embodiment, DRR device 112 stores the packages in a sequential order utilizing a specific unique identifier. In one embodiment, the specific unique identifier will be persisted together with the package in order to facilitate searching for the package in the package archive later. In one embodiment, DRR device 112 stores the package for a configurable storage time limit, and the continuously deletes obsolete or time expired packages that bypass (i.e., exceed) the configurable storage time limit. In one embodiment, DRR device 112 stores the package in the package archive with associated metadata specific to the package and the IoT device from which the package originated.

Figure 4:
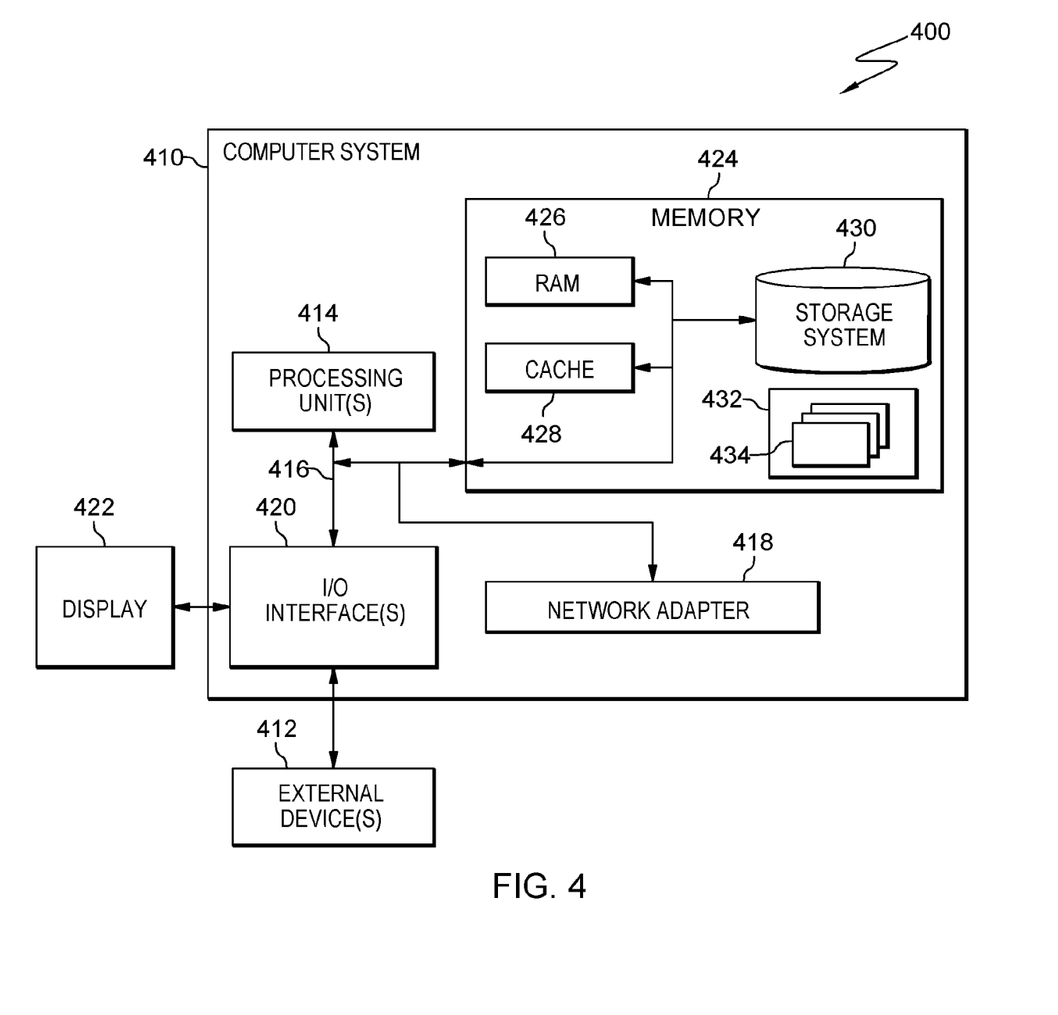
FIG. 4 is a block diagram, generally designated 400, depicting components of a data processing environment, such as the server of FIG. 1, in accordance with an embodiment of the present invention.

FIG. 4 is a block diagram, generally designated 400, depicting components of a data processing environment, such as server 104 of data processing environment 100, in accordance with an embodiment of the present invention. It should be appreciated that FIG. 4 provides only an illustration of one implementation and does not imply any limitations with regard to the environments in that different embodiments may be implemented. Many modifications to the depicted environment may be made.

In the illustrative embodiment, server 104 in data processing environment 100 is shown in the form of a general-purpose computing device, such as computer system 410. The components of computer system 410 may include, but are not limited to, one or more processors or processing unit(s) 414, memory 424 and bus 416 that couples various system components including memory 424 to processing unit(s) 414.

Bus 416 represents one or more of any of several types of bus structures, including a memory bus or memory controller, a peripheral bus, an accelerated graphics port and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus and Peripheral Component Interconnect (PCI) bus.

Computer system 410 typically includes a variety of computer system readable media. Such media may be any available media that is accessible by computer system 410 and it includes both volatile and non-volatile media, removable and non-removable media.

Memory 424 can include computer system readable media in the form of volatile memory, such as random-access memory (RAM) 426 and/or cache memory 428. Computer system 410 may further include other removable/non-removable, volatile/non-volatile computer system storage media. By way of example only, storage system 430 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk") and an optical disk drive for reading from or writing to a removable, non-volatile optical disk, such as a CD-ROM, DVD-ROM or other optical media can be provided. In such instances, each can be connected to bus 416 by one or more data media interfaces. As will be further depicted and described below, memory 424 may include at least one computer program product having a set (e.g., at least one) of program modules that are configured to carry out the functions of embodiments of the invention.

Program/utility 432, having one or more sets of program modules 434, may be stored in memory 424 by way of example and not limitation, as well as an operating system, one or more application programs, other program modules and program data. Each of the operating systems, one or more application programs, other program modules and program data or some combination thereof, may include an implementation of a networking environment. Program modules 434 generally carry out the functions and/or methodologies of embodiments of the invention as described herein. Computer system 410 may also communicate with one or more external device(s) 412, such as a keyboard, a pointing device, a display 422, etc. or one or more devices that enable a user to interact with computer system 410 and any devices (e.g., network card, modem, etc.) that enable computer system 410 to communicate with one or more other computing devices. Such communication can occur via Input/Output (I/O) interface(s) 420. Still yet, computer system 410 can communicate with one or more networks, such as a local area network (LAN), a general wide area network (WAN) and/or a public network (e.g., the Internet) via network adapter 418. As depicted, network adapter 418 communicates with the other components of computer system 410 via bus 416. It should be understood that although not shown, other hardware and software components, such as microcode, device drivers, redundant processing units, external disk drive arrays, RAID systems, tape drives and data archival storage systems may be used in conjunction with computer system 410.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable) or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems) and computer program products according to embodiments of the invention. It will be understood that each block of the flowchart illustrations and/or block diagrams and combinations of blocks in the flowchart illustrations and/or block diagrams, can be implemented by computer readable program instructions.

These computer readable program instructions may be provided to a processor of a general purpose computer, a special purpose computer or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus or other device to cause a series of operational steps to be performed on the computer, other programmable apparatus or other device to produce a computer implemented process, such that the instructions which execute on the computer, other programmable apparatus or other device implement the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace or to enable others of ordinary skill in the art to understand the embodiments disclosed herein.

The terminology used herein is for the purpose of describing particular embodiments only and is not intended to be limiting of the invention. It should be appreciated that any particular nomenclature herein is used merely for convenience and thus, the invention should not be limited to use solely in any specific function identified and/or implied by such nomenclature. Furthermore, as used herein, the singular forms of "a", "an", and "the" are intended to include the plural forms as well, unless the context clearly indicates otherwise.

What is claimed is:

1. A method for providing network-based data packet monitoring and recovery, the method comprising:
   continuously monitoring, by one or more computer processors of a disaster recovery device, a database on a communication server for gaps in network traffic data sent from an edge device to the communication server, wherein the disaster recovery device monitors and stores data packets generated by a specific set of edge devices and sent to the communication server;
   determining, by the one or more computer processors, whether at least one gap in the network traffic data is identified in the database on the communication server;
   responsive to determining that at least one gap in the network traffic data is identified in the database on the communication server, determining, by the one or more computer processors, missing data packets associated with the at least one gap from a data packet archive on the disaster recovery device;
   determining, by the one or more computer processors, whether there is active network traffic between the edge device and the communication server; and
   responsive to determining that there is active network traffic between the edge device and the communication server, replaying, by the one or more computer processors, the missing data packets in the active network traffic between the edge device and the communication server.

2. The method of claim 1, wherein determining whether the at least one gap in the network traffic data is identified in the database on the communication server, further comprises:
   scanning, by the one or more computer processors, a plurality of primary keys of a plurality of records in the database on the communication server to determine whether the plurality of primary keys within a specific range of primary keys is not ordered sequentially.

3. The method of claim 1, wherein determining the missing data packets from the data packet archive, further comprises:
   querying, by the one or more computer processors, the data packet archive for one or more specific data packets having a plurality of primary keys missing from a sequential order of primary keys within a specific range of primary keys.

4. The method of claim 1, wherein determining whether there is active network traffic between the edge device and the communication server, further comprises:
   monitoring, by the one or more computer processors, a network connection shared between the edge device and the communication server to identify an exchange of specific data packets in the active network traffic, wherein the specific data packets are transmission control protocol (TCP) packages transmitted between the edge device and the communication server;

arranging, by the one or more computer processors, the specific data packets in a sequential order; and differentiating, by the one or more computer processors, the active network traffic generated by the edge device from general network traffic.

5. The method of claim 1, wherein replaying the missing data packets in the active network traffic between the edge-device and the communication server, further comprises:

injecting, by the one or more computer processors, the missing data packets into the active network traffic towards the communication server, wherein the missing data packets are in a previously encrypted format.

6. The method of claim 1, further comprising:

responsive to determining that there is no active network traffic, alerting, by the one or more computer processors, a user of a device failure, wherein alerting the user of the device failure includes identifying the missing data packets that failed to transmit in the active network traffic between the edge device and the communication server, identifying that the data package that failed to transmit also failed to save in the database on the communication server, and identifying an error in a sequential order of a plurality of primary keys in one or more tables of the database on the communication server.

7. The method of claim 1, further comprising:

determining, by the one or more computer processors, whether at least one data packet is being transmitted from the edge device to the communication server, wherein determining whether at least one data packet is being transmitted from the edge device to the communication server includes confirming the at least one data packet originates from the edge device;

responsive to determining that the at least one data packet is being transmitted from the edge device to the communication server, capturing, by the one or more computer processors, a duplicate of the at least one data packet from the active network traffic; and storing, by the one or more computer processors, the at least one data packet in the data packet archive in a sequential order utilizing a specific unique identifier, wherein the specific unique identifier persists together with the at least one data packet to facilitate searching for the at least one data packet in the data packet archive.

8. A computer program product for providing network-based data packet monitoring and recovery, the computer program product comprising:

one or more computer readable storage media and program instructions stored on the one or more computer readable storage media, the stored program instructions comprising:

program instructions to continuously monitor, via a disaster recovery device, a database on a communication server for gaps in network traffic data sent from an edge device to the communication server, wherein the disaster recovery device monitors and stores data packets generated by a specific set of edge devices and sent to the communication server;

program instructions to determine whether at least one gap in the network traffic data is identified in the database on the communication server;

program instructions to, responsive to that at least one gap in the network traffic data is identified in the database on the communication server, determine missing data packets associated with the at least one gap from a data packet archive on the disaster recovery device;

program instructions to determine whether there is active network traffic between the edge device and the communication server; and program instructions to, responsive to determining that there is active network traffic between the edge device and the communication server, replay the missing data packets in the active network traffic between the edge device and the communication server.

9. The computer program product of claim 8, the program instructions to determine whether the at least one gap in the network traffic data is identified in the database on the communication server further comprising:

program instruction to scan a plurality of primary keys of a plurality of records in the database on the communication server to determine whether the plurality of primary keys within a specific range of primary keys is not ordered sequentially.

10. The computer program product of claim 8, the program instructions to determine the missing data packets from the data packet archive further comprise:

program instructions to query the data packet archive for one or more specific data packets having a plurality of primary keys missing from a sequential order of primary keys within a specific range of primary keys.

11. The computer program product of claim 8, the program instructions to determine whether there is active network traffic between the edge device and the communication server further comprising:

program instructions to monitor a network connection shared between the edge device and the communication server to identify an exchange of specific data packets in the active network traffic, wherein the specific data packets are transmission control protocol (TCP) packages transmitted between the edge device and the communication server;

program instructions to arrange the specific data packets in a sequential order; and program instructions to differentiate the active network traffic generated by the edge device from general network traffic.

12. The computer program product of claim 8, the program instructions to replay the missing data packets in the active network traffic between the edge device and the communication server further comprising:

program instructions to inject the missing data packets into the active network traffic towards the communication server, wherein the missing data packets are in a previously encrypted format.

13. The computer program product of claim 8, the stored program instructions further comprising:

program instructions to, responsive to determining that there is no active network traffic, alert a user of a device failure, wherein alerting the user of the device failure includes identifying the missing data packets that failed to transmit in the active network traffic between the edge device and the communication server, identifying that the missing data packets that failed to transmit also failed to save in the database on the communication server, and identifying an error in a sequential order of a plurality of primary keys in one or more tables of the database on the communication server.

14. The computer program product of claim 8, the stored program instructions further comprising:

program instructions to determine whether at least one data packet is being transmitted from the edge device to the communication server, wherein determining whether at least one data packet is being transmitted from the edge device to the communication server includes confirming the at least one data packet originates from the edge device;

program instructions to, responsive to determining that the at least one data packet is being transmitted from the edge device to the communication server, capture a duplicate of the at least one data packet from the active network traffic; and program instructions to store the at least one data packet in the data packet archive in a sequential order utilizing a specific unique identifier, wherein the specific unique identifier persists together with the at least one data packet to facilitate searching for the at least one data packet in the data packet archive.

15. A computer system for network-based data packet monitoring and recovery, the computer system comprising:

one or more computer processors;

one or more computer readable storage media; and program instructions stored on at least one of the one or more computer readable storage media for execution by at least one of the one or more computer processors, the stored program instructions comprising:

program instructions to continuously monitor, via a disaster recovery device, a database on a communication server for gaps in network traffic data sent from an edge device to the communication server, wherein the disaster recovery device monitors and stores data packets generated by a specific set of edge devices and sent to the communication server;

program instructions to determine whether at least one gap in the network traffic data is identified in the database on the communication server;

program instructions to, responsive to determining that at least one gap in the network traffic data is identified in the database on the communication server, determine missing data packets associated with the at least one gap from a data packet archive on the disaster recovery device;

program instructions to determine whether there is active network traffic between the edge device and the communication server; and program instructions to, responsive to determining that there is active network traffic between the edge device and the communication server, replay the missing data packets in the active network traffic between the edge device and the communication server.

16. The computer system of claim 15, the program instructions to determine whether the at least one gap in the network traffic data is identified in the database on the communication server further comprising:

program instruction to scan a plurality of primary keys of a plurality of records in the database on the communication server to determine whether the plurality of primary keys within a specific range of primary keys is not ordered sequentially.

17. The computer system of claim 15, the program instructions to determine the missing data packets from the data packet archive further comprising:

program instructions to query the data packet archive for one or more specific data data packets having a plurality of primary keys missing from a sequential order of primary keys within a specific range of primary keys.

18. The computer system of claim 15, the program instructions to determine whether there is active network traffic between the edge device and the communication server further comprising:

program instructions to monitor a network connection shared between the edge device and the communication server to identify an exchange of specific data packets in the active network traffic, wherein the specific data packets are transmission control protocol (TCP) packages transmitted between the edge device and the communication server;

program instructions to arrange the specific data packets in a sequential order; and program instructions to differentiate the active network traffic generated by the edge device from general network traffic.

19. The computer system of claim 15, the program instructions to replay the missing data packets in the active network traffic between the edge device and the communication server further comprising:

program instructions to inject the missing data packets into the active network traffic towards the communication server, wherein the missing data packets is in a previously encrypted format.

20. The computer system of claim 15, the stored program instructions further comprising:

program instructions to, responsive to determining that there is no active network traffic, alert a user of a device failure, wherein alerting the user of the device failure includes identifying the missing data packets that failed to transmit in the active network traffic between the edge device and the communication server, identifying that the missing data packets that failed to transmit also failed to save in the database on the communication server, and identifying an error in a sequential order of a plurality of primary keys in one or more tables of the database on the communication server.

* * * * *